US009955816B2

(12) United States Patent
Yoshidome et al.

(10) Patent No.: US 9,955,816 B2
(45) Date of Patent: May 1, 2018

(54) BEVERAGE PREPARATION APPARATUS

(71) Applicant: SHARP KABUSHIKI KAISHA, Osaka-shi, Osaka (JP)

(72) Inventors: Akihiro Yoshidome, Osaka (JP); Naozumi Sugimoto, Osaka (JP); Nahoko Sakumasu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 49 days.

(21) Appl. No.: 15/039,802

(22) PCT Filed: Jan. 26, 2015

(86) PCT No.: PCT/JP2015/052048
§ 371 (c)(1),
(2) Date: May 26, 2016

(87) PCT Pub. No.: WO2015/115374
PCT Pub. Date: Aug. 6, 2015

(65) Prior Publication Data
US 2016/0374503 A1 Dec. 29, 2016

(30) Foreign Application Priority Data

Jan. 31, 2014 (JP) .................................. 2014-016469

(51) Int. Cl.
*A47J 31/42* (2006.01)
*A47J 31/46* (2006.01)
(Continued)

(52) U.S. Cl.
CPC .............. *A47J 31/42* (2013.01); *A47J 31/465* (2013.01); *A47J 42/38* (2013.01); *A47J 31/401* (2013.01)

(58) Field of Classification Search
CPC ................................. A47J 31/42; A47J 31/401
(Continued)

(56) References Cited

U.S. PATENT DOCUMENTS 2,008,065 A * 7/1935 Douglas ................. G01N 33/02
434/127
5,186,399 A * 2/1993 Knepler .................. A47J 31/42
241/34
(Continued)

FOREIGN PATENT DOCUMENTS

EP 0213645 * 3/1987 .............. A47J 31/42
JP 57-170214 A 10/1982
(Continued)

OTHER PUBLICATIONS

International Search Report for PCT/JP2015/052048 dated Mar. 3, 2015.
(Continued)

*Primary Examiner* — Reginald L Alexander
(74) *Attorney, Agent, or Firm* — Birch, Stewart, Kolasch & Birch, LLP

(57) ABSTRACT

A beverage preparation apparatus includes a milling unit which obtains powders by grating an object to be grated, a liquid storage tank which stores a liquid, a liquid supply path having one end connected to the liquid storage tank and having the other end provided with a supply port, a powder reception portion which is provided to be movable and receives powders obtained by the milling unit, and an agitation tank which has an opening portion opening upward and mixes the powders introduced through the opening portion from the moved powder reception portion and the liquid supplied through the opening portion from the supply port. The milling unit includes an outlet port which discharges the obtained powders into the powder reception
(Continued)

portion and the outlet port is located below the opening portion.

6 Claims, 15 Drawing Sheets

(51) Int. Cl.
*A47J 42/38* (2006.01)
*A47J 31/40* (2006.01)

(58) Field of Classification Search
USPC .......................................... 99/286, 287, 290
See application file for complete search history.

(56) References Cited

U.S. PATENT DOCUMENTS

| | | | |
|---|---|---|---|
| 8,739,687 B1 * | 6/2014 | Tacklind | A47J 31/42 99/280 |
| 2007/0017378 A1 | 1/2007 | Takizawa et al. | |

FOREIGN PATENT DOCUMENTS

| | | | |
|---|---|---|---|
| JP | 2-198524 A | 8/1990 | |
| JP | 2001-61664 A | 3/2001 | |
| JP | 2001-275843 A | 10/2001 | |
| JP | 2007-54609 A | 3/2007 | |

OTHER PUBLICATIONS

Written Opinion of the International Searching Authority for PCT/JP2015/052048 dated Mar. 3, 2015.

* cited by examiner

FIG.14
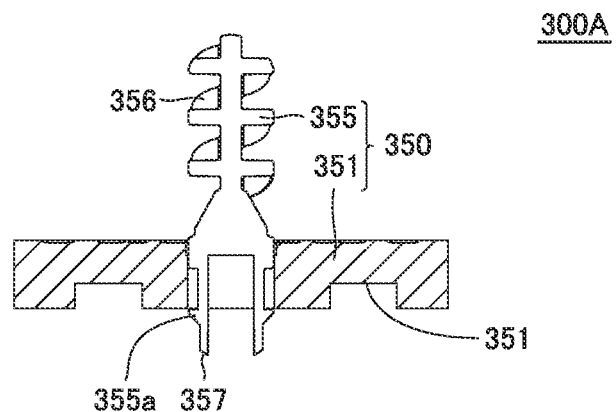
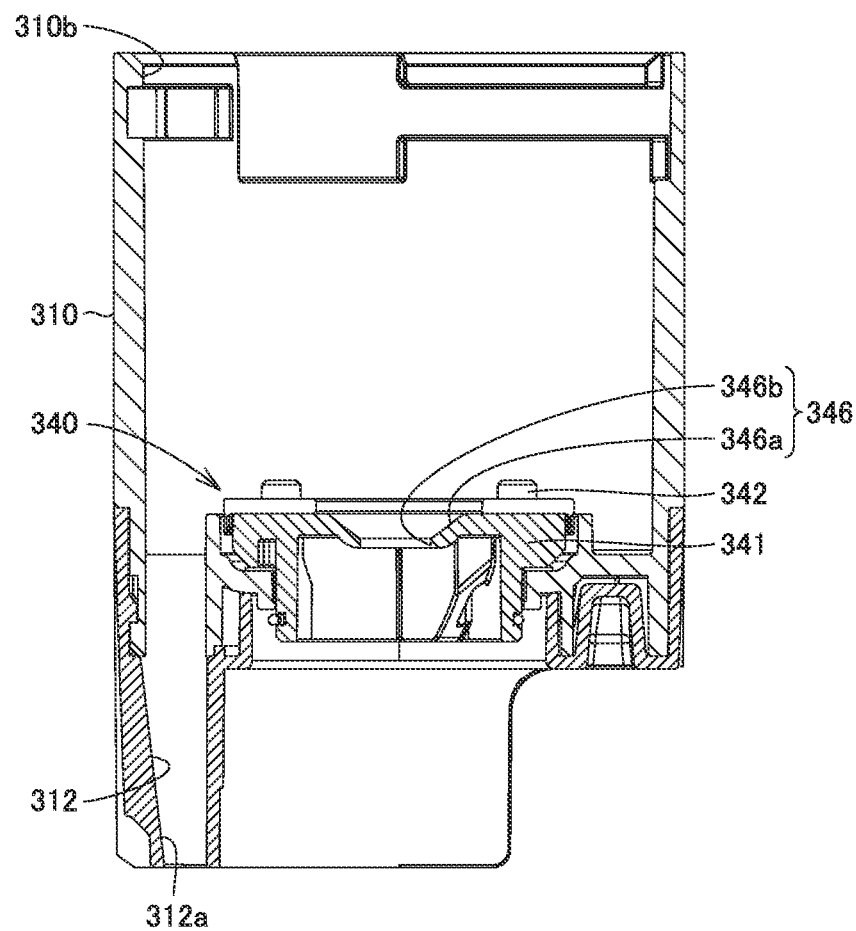

BEVERAGE PREPARATION APPARATUS

TECHNICAL FIELD

The present invention relates to a beverage preparation apparatus for preparing a beverage by using a liquid and powders obtained by grating an object to be grated.

BACKGROUND ART

Various beverage preparation apparatuses which includes a milling unit for grating such an object to be grated as tea leaves and a liquid storage tank storing a liquid, for preparing a beverage by mixing the liquid and the powders obtained by the milling unit, have recently been developed. For example, Japanese Patent Laying-Open No. 2001-275843 (PTD 1) represents a reference disclosing such a beverage preparation apparatus.

The beverage preparation apparatus disclosed in PTD 1 includes a liquid storage tank which can store a liquid and can heat the liquid therein, a liquid supply portion connected to the liquid storage tank for supplying the liquid (hot water) heated in the liquid storage tank to a vessel, and a milling unit which supplies a certain amount of powders into the vessel. The vessel is placed on a placement base provided in an apparatus main body. The milling unit includes an outlet port for discharging powders into the vessel and a shutter provided at the outlet port, which can be opened and closed. The outlet port is provided above the vessel.

During preparation of a beverage, after a small amount of hot water is supplied into the vessel from the liquid supply portion, the shutter is opened so that a prescribed amount of powders is discharged into the vessel from the outlet port of the milling unit. The shutter is closed after discharge of the powders and lapse of a prescribed period of time. In succession, hot water is further supplied from the liquid supply portion. As the powders discharged into the vessel are agitated by newly poured hot water, tea is prepared.

By thus providing a shutter which opens and closes the outlet port, entry of steam resulting from hot water supplied to the vessel into a powder discharge path through the outlet port and resultant solidification of powders around the outlet port can be suppressed.

CITATION LIST

Patent Document

PTD 1: Japanese Patent Laying-Open No. 2001-275843

SUMMARY OF INVENTION

Technical Problem

In the beverage preparation apparatus disclosed in PTD 1, however, the outlet port cannot completely hermetically be closed by the shutter alone, and entry of steam through a small gap between the shutter and the outlet port into the outlet port is concerned. Therefore, powders may adhere to a portion around the outlet port and the outlet port may be clogged in the worst case. In addition, a drive portion for opening and closing the shutter is required, which makes a construction complicated.

The present invention was made in view of the problems as described above, and an object of the present invention is to provide a beverage preparation apparatus in which entry of steam into a powder discharge path can be prevented with a simplified construction.

Solution to Problem

A beverage preparation apparatus based on the present invention is a beverage preparation apparatus preparing a beverage by using powders, and the beverage preparation apparatus includes a milling unit which obtains powders by grating an object to be grated, a liquid storage tank which stores a liquid, a liquid supply path having one end connected to the liquid storage tank and having the other end provided with a supply port, a powder reception portion which is provided to be movable and receives the powders obtained by the milling unit, and an agitation tank which has an opening portion opening upward and mixes the powders introduced through the opening portion from the moved powder reception portion and the liquid supplied through the opening portion from the supply port. The milling unit includes an outlet port which discharges the obtained powders into the powder reception portion, and the outlet port is located below the opening portion.

In the beverage preparation apparatus based on the present invention, preferably, the milling unit is arranged at a distance from the agitation tank so as to be displaced from the agitation tank below the agitation tank.

In the beverage preparation apparatus according to the present invention, preferably, a part of the agitation tank is provided to protrude from a main body of the beverage preparation apparatus in a direction intersecting with a vertical direction. In this case, preferably, the agitation tank further includes a discharge portion for discharging a prepared beverage, and the discharge portion is preferably provided in the agitation tank in a portion protruding from the main body of the beverage preparation apparatus.

In the beverage preparation apparatus according to the present invention, preferably, the main body of the beverage preparation apparatus includes an agitation tank attachment portion for externally attaching the agitation tank. Preferably, the agitation tank is removably attached to the agitation tank attachment portion, In this case, preferably, the prepared beverage can be poured through the opening portion, with the agitation tank having been removed from the agitation tank attachment portion.

In the beverage preparation apparatus according to the present invention, preferably, the milling unit includes an upper mill and a lower mill portion which grate an object to be grated and a lower mill portion support portion to which the lower mill portion is attached. In this case, preferably, the lower mill portion support portion has a first locking portion for locking the lower mill portion and a guide portion for assisting movement of the lower mill portion in attachment of the lower mill portion to the lower mill portion support portion and supports the lower mill portion from a side opposite to a side where the upper mill is located in an attachment state in which the lower mill portion is attached. The lower mill portion preferably has a second locking portion locked by the first locking portion. Furthermore, in this case, the lower mill portion is preferably attached to the lower mill portion support portion as the lower mill portion is moved along the guide portion toward the lower mill portion support portion so that the first locking portion and the second locking portion are locked by each other.

In the beverage preparation apparatus based on the present invention, preferably, the milling unit includes an objectto-be-grated inlet from which an object to be grated is introduced and a linear rib provided to lie across the object-to-be-grated inlet.

Advantageous Effects of Invention

According to the present invention, a beverage preparation apparatus in which entry of steam into a powder discharge path can be prevented with a simplified construction can be provided.

BRIEF DESCRIPTION OF DRAWINGS

FIG. 14 is a diagram for illustrating an attachment operation for attaching the lower mill of a milling unit provided in a beverage preparation apparatus in a second embodiment to the lower mill portion support portion.

DESCRIPTION OF EMBODIMENTS

Figure 1:
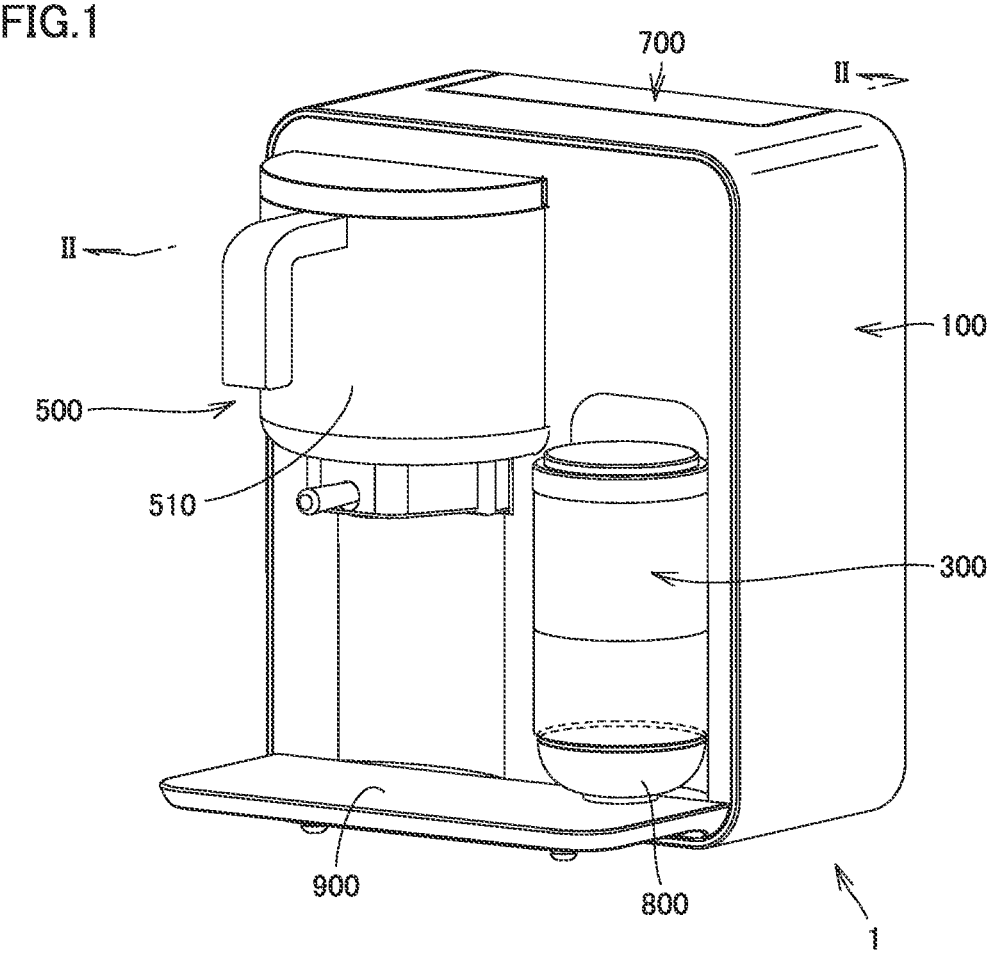
FIG. 1 is an overall perspective view of a beverage preparation apparatus in a first embodiment.

A beverage preparation apparatus in the present embodiment will be described with reference to the drawings. In the drawings of the embodiments described below, the same or corresponding elements have the same reference numeral allotted and redundant description may not be repeated. When the number or an amount is mentioned in each embodiment, the scope of the present invention is not necessarily limited to the number or the amount unless otherwise specified.

In the present embodiment, though a case that tea leaves are used as an object to be grated and tea is prepared as a beverage will be described by way of example, the object to be grated is not limited to tea leaves, but the embodiment can also be applied to preparation of a beverage with cereals, dried goods, and other objects to be grated.

Hereinafter, tea leaves mean a solid state before grating, powder tea leaves mean grated tea leaves, and tea means a beverage obtained by agitating (mixing) powder tea leaves and hot water.

First Embodiment

Beverage Preparation Apparatus 1

Figure 2:
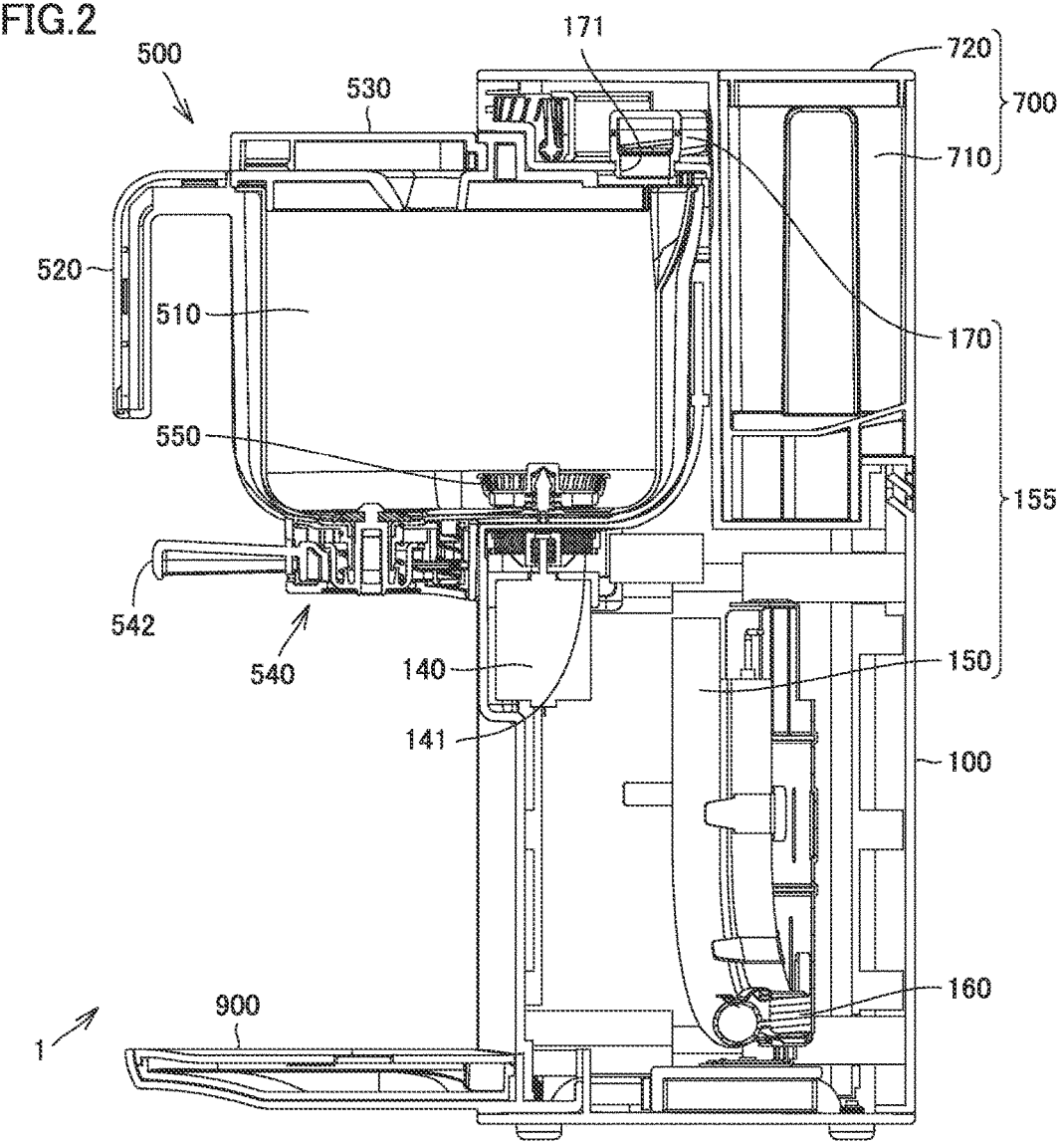
FIG. 2 is a cross-sectional view along the line II-II in FIG. 1.
Figure 3:
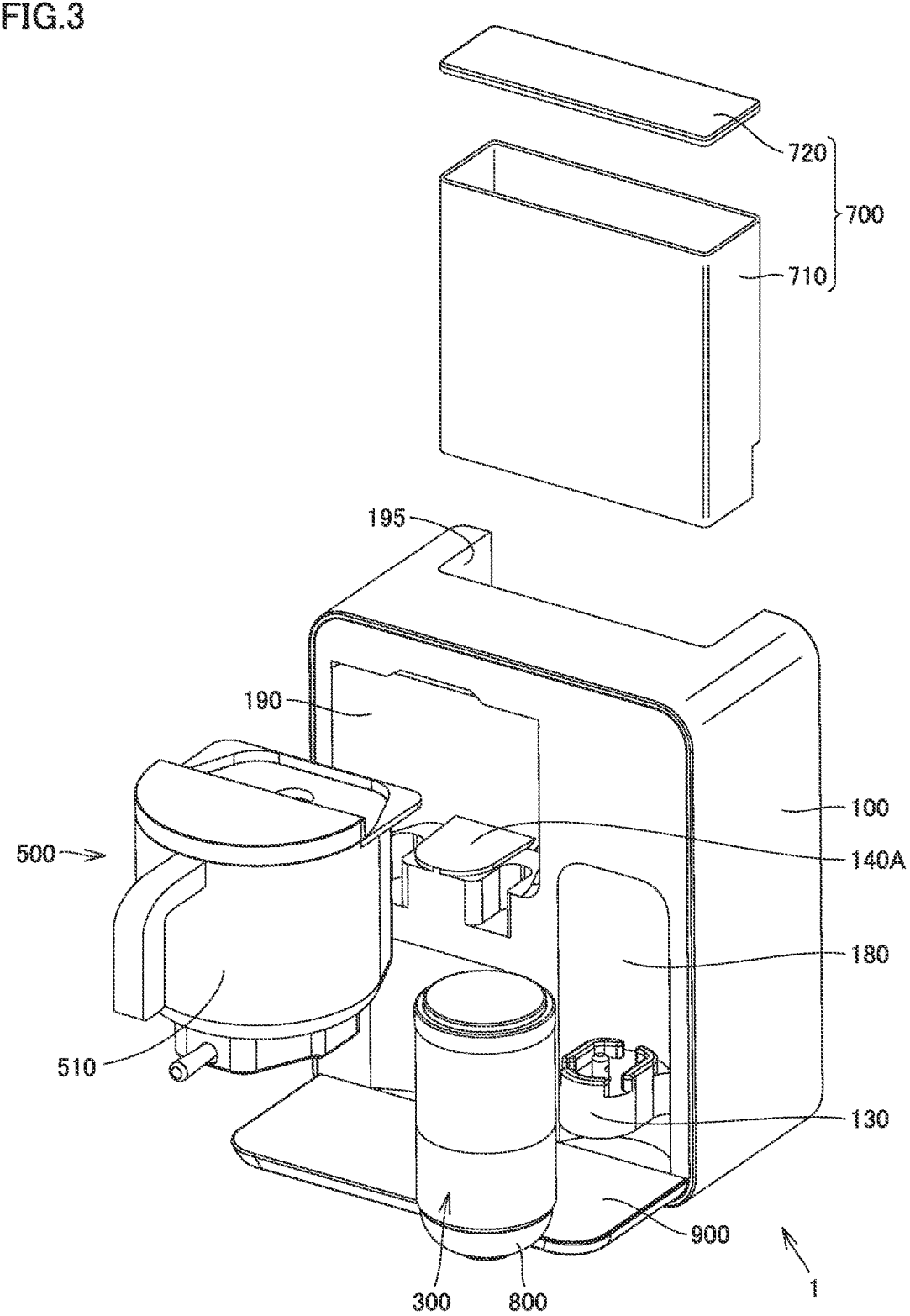
FIG. 3 is an overall perspective view showing a schematic component of the beverage preparation apparatus in the first embodiment.

A beverage preparation apparatus 1 in the present embodiment will be described with reference to FIGS. 1 to 3. FIG. 1 is an overall perspective view of beverage preparation apparatus 1, FIG. 2 is a cross-sectional view along the line II-II in FIG. 1, and FIG. 3 is an overall perspective view of a schematic component of beverage preparation apparatus 1.

Beverage preparation apparatus 1 uses tea leaves as an object to be grated and obtains tea leaf powders by grating the tea leaves. The beverage preparation apparatus uses the obtained tea leaf powders for preparing tea as a beverage. Beverage preparation apparatus 1 includes an apparatus main body 100 as a main body of the beverage preparation apparatus, a milling unit 300, an agitation unit 500, a liquid storage tank 700, a liquid supply path 155 (see FIG. 2), a tea leaf powder tray 800 as a powder reception portion, and a placement base 900. Placement base 900 is provided to protrude forward on a front side in a lower portion of apparatus main body 100 and a cup (not shown) and tea leaf powder tray 800 can be placed thereon. Tea leaf powder tray 800 is provided such that a user can hold and move the tray.

Milling Unit 300

Milling unit 300 is removably attached to a milling unit attachment portion 180 provided on a front surface side of apparatus main body 100. Milling unit 300 is arranged, for example, at a distance from an agitation tank 510 so as to be displaced from agitation tank 510 below agitation tank 510 included in agitation unit 500 when viewed from the front.

A milling driving force coupling mechanism 130 is provided in milling unit attachment portion 180 so as to protrude forward and milling unit 300 is removably attached to this milling driving force coupling mechanism 130. Milling unit 300 obtains driving force for milling tea leaves representing an object to be grated by being coupled to milling driving force coupling mechanism 130.

Tea leaves introduced from an upper portion of milling unit 300 into milling unit 300 are finely grated in milling unit 300. The grated tea leaves are dropped and collected as tea leaf powders on tea leaf powder tray 800 placed below milling unit 300. A detailed structure of milling unit 300 will be described later with reference to FIGS. 8 to 11.

Liquid Storage Tank 700

Liquid storage tank 700 is removably attached to a liquid storage tank attachment portion 195 provided on an upper surface side of apparatus main body 100. Liquid storage tank 700 includes a tank main body 710 having an opening in an upper surface and a lid portion 720 closing the opening in the upper surface of tank main body 710. Liquid storage tank 700 stores such a liquid as water.

Liquid Supply Path 155

Liquid supply path 155 is accommodated in apparatus main body 100. Liquid supply path 155 is connected to liquid storage tank 700 (see FIG. 7). Liquid supply path 155 is provided with a supply port 171 on a side opposite to a side where liquid storage tank 700 is connected. Liquid supply path 155 includes a hot water supply pipe 150 and a hot water supply nozzle 170. Hot water supply pipe 150 has one end side connected to liquid storage tank 700 and the other end side connected to hot water supply nozzle 170. A liquid introduced from liquid storage tank 700 into liquid supply path 155 is supplied to agitation unit 500 through hot water supply pipe 150 and hot water supply nozzle 170.

Agitation Unit 500

Agitation unit 500 includes an agitation blade 550 for agitating a liquid and powders and agitation tank 510 accommodating agitation blade 550. Agitation tank 510 is removably attached to an agitation tank attachment portion 190 provided on the front surface side of apparatus main body 100. Agitation tank 510 is attached to agitation tank attachment portion 190 so as to protrude from apparatus main body 100 in a direction intersecting with a vertical direction. Specifically, agitation tank 510 is attached such that a part of agitation tank 510 protrudes forward from a front surface of apparatus main body 100.

An agitation motor contactless table 140A is provided in agitation tank attachment portion 190. Agitation unit 500 is placed on agitation motor contactless table 140A. Agitation blade 550 provided in agitation unit 500 is rotated by an agitation motor unit 140 accommodated in apparatus main body 100 so as to be located below agitation motor contactless table 140A and a magnet 141 coupled thereto.

Hot water supply nozzle 170 is provided above agitation tank attachment portion 190 of apparatus main body 100. In apparatus main body 100, a temperature of water in hot water supply pipe 150 is raised to a prescribed temperature and hot water is supplied from hot water supply nozzle 170 into agitation tank 510. Hot water prepared in apparatus main body 100 and tea leaf powders obtained by milling unit 300 are introduced into agitation tank 510, and hot water and tea leaf powders are agitated by agitation blade 550 in agitation tank 510. Tea is thus prepared in agitation tank 510.

Tea prepared in agitation unit 500 can be poured into a cup (not shown) placed on placement base 900 by operating an operation lever 542 of a discharge port opening and closing mechanism 540 provided below agitation unit 500. A detailed structure of agitation unit 500 will be described later with reference to FIGS. 12 and 13.

Flow of Preparation of Tea (Beverage)

Figure 4:
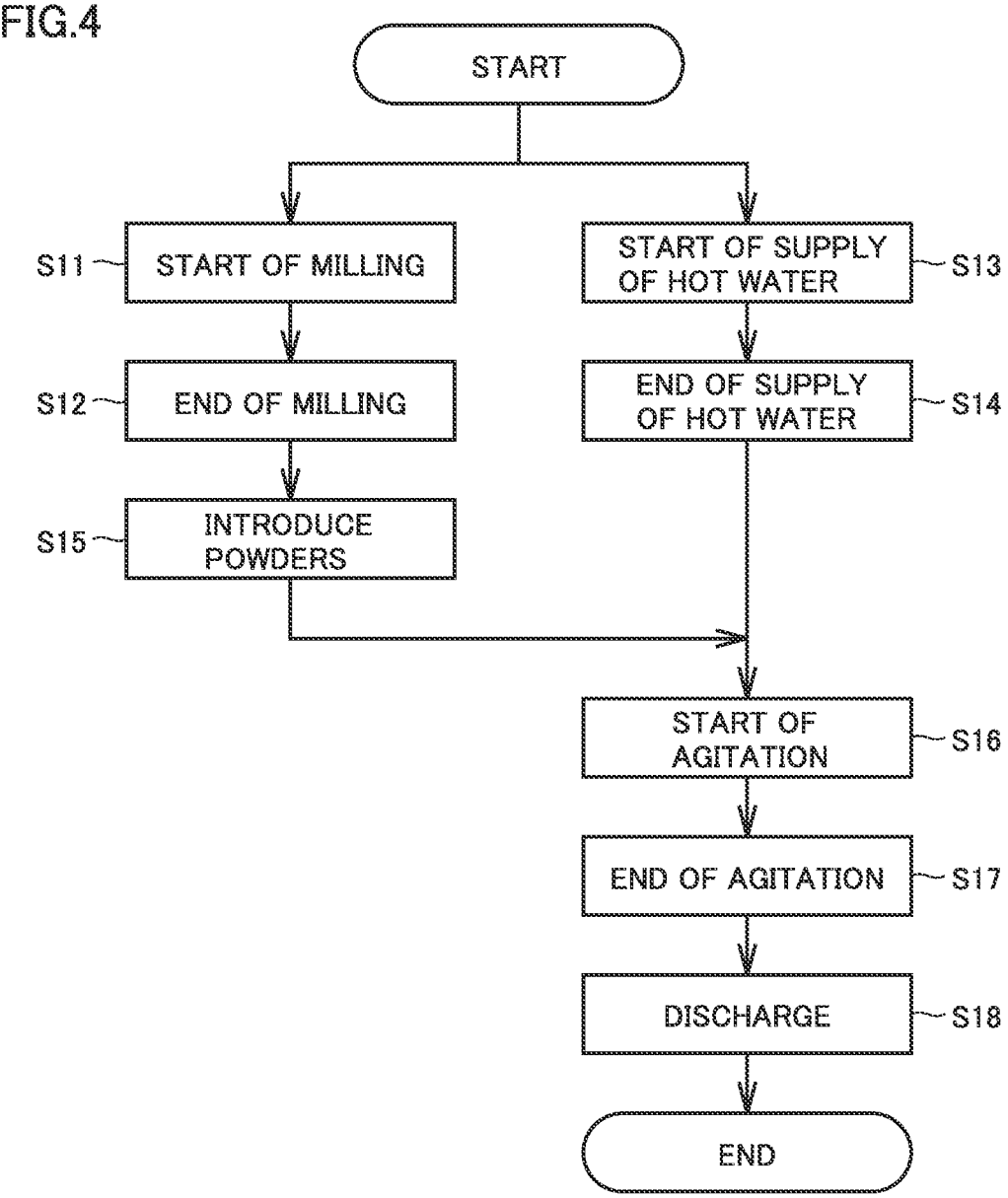
FIG. 4 shows a first preparation flow showing discharge of tea using the beverage preparation apparatus in the first embodiment.
Figure 5:
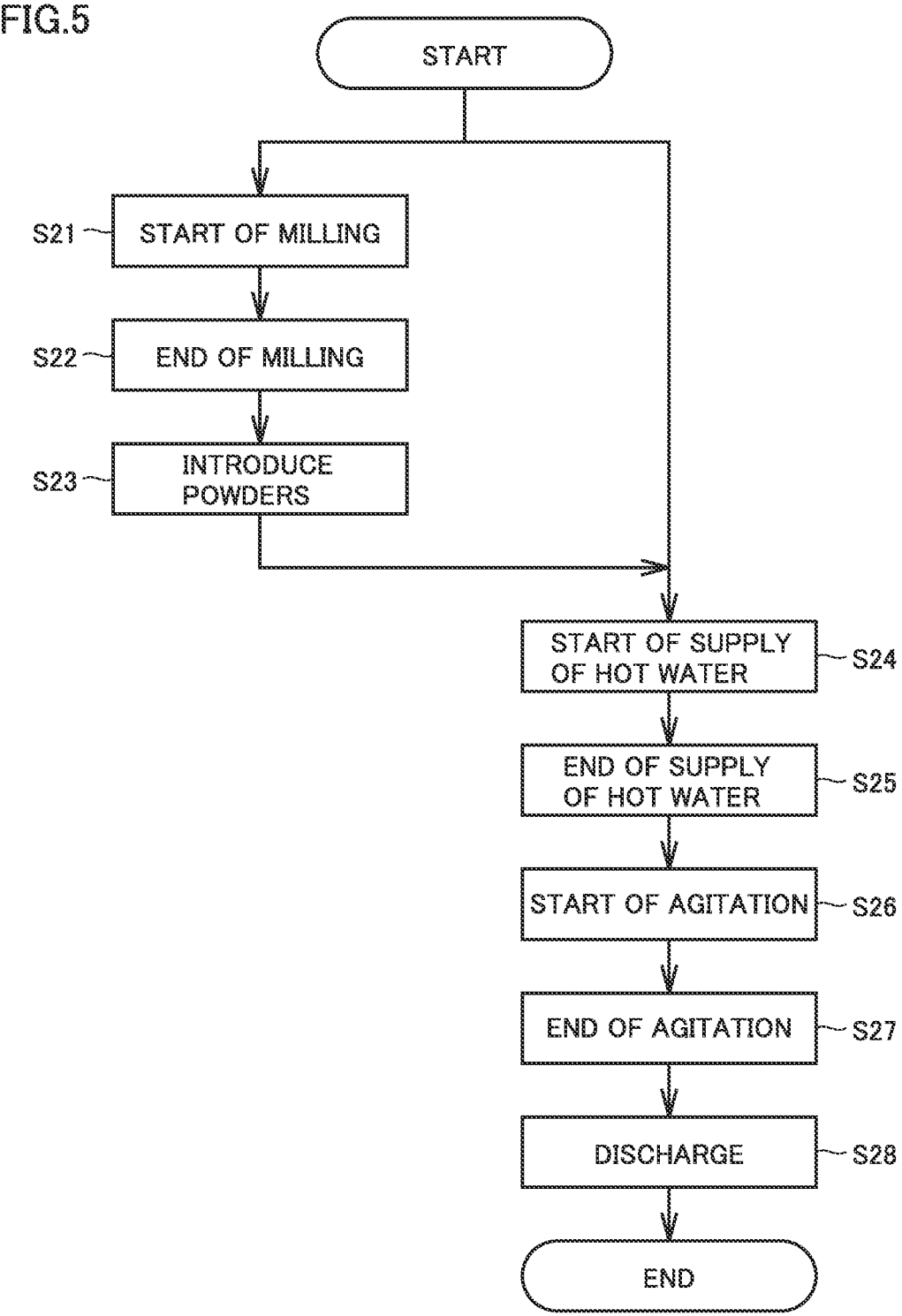
FIG. 5 shows a second preparation flow showing discharge of tea using the beverage preparation apparatus in the first embodiment.
Figure 6:
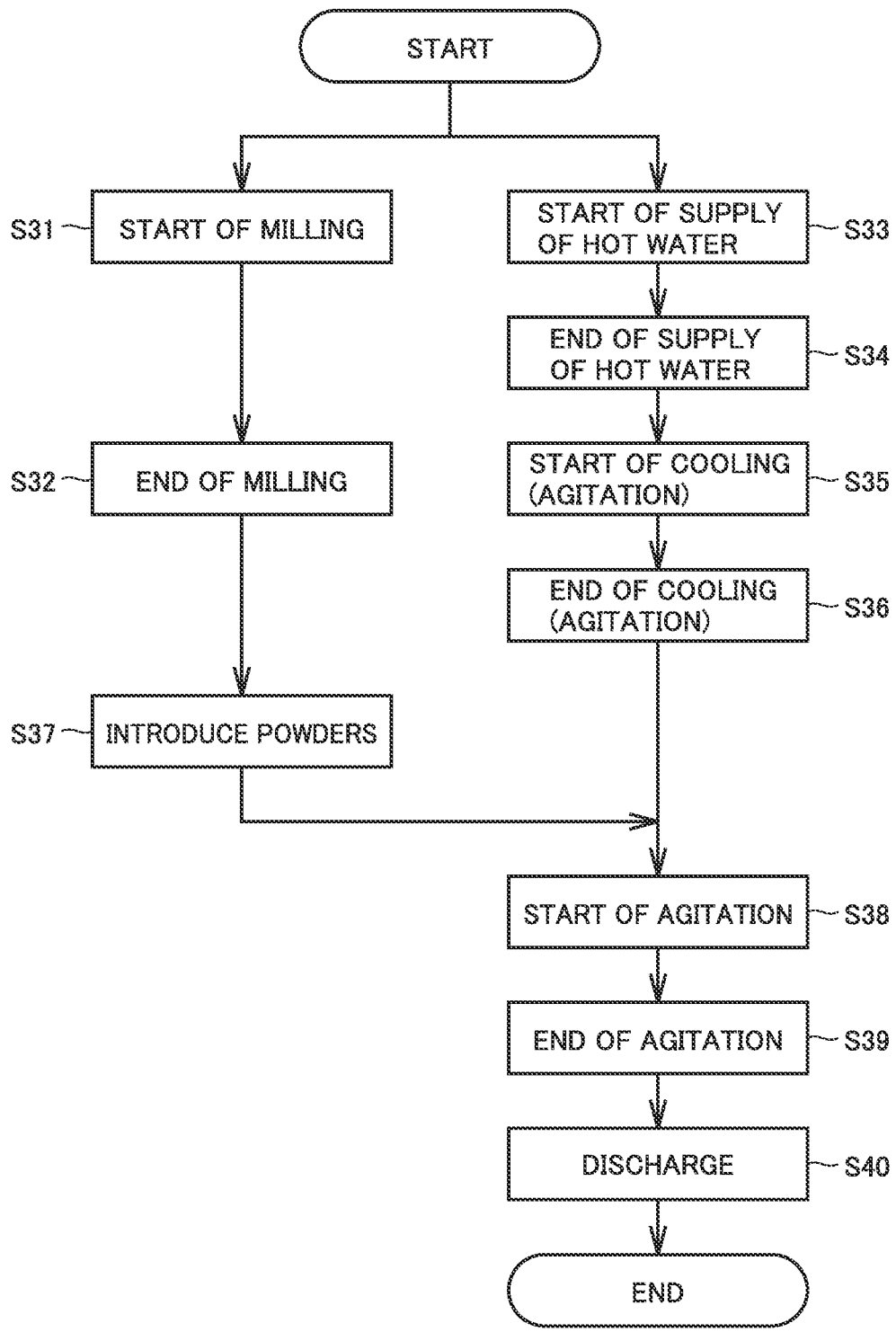
FIG. 6 shows a third preparation flow showing discharge of tea using the beverage preparation apparatus in the first embodiment.

A flow of preparation of tea (beverage) with the use of beverage preparation apparatus 1 will now be described with reference to FIGS. 4 to 6. FIGS. 4 to 6 show first to third preparation flows showing discharge of tea using beverage preparation apparatus 1, respectively. A prescribed amount of tea leaves is introduced into milling unit 300 and a prescribed amount of water is stored in liquid storage tank 700.

First Preparation Flow

A first preparation flow will be described with reference to FIG. 4. This first preparation flow is a flow in which grating of tea leaves in milling unit 300 and supply of hot water from apparatus main body 100 to agitation unit 500 are simultaneously carried out.

In beverage preparation apparatus 1, milling of tea leaves by milling unit 300 in a step 11 and supply of hot water from apparatus main body 100 to agitation unit 500 in a step 13 are simultaneously started. Then, milling of tea leaves by milling unit 300 ends in a step 12, and supply of hot water from apparatus main body 100 to agitation unit 500 ends in a step 14.

In a step 15, tea leaf powders obtained in step 12 are introduced into agitation unit 500 by a user.

Then, in a step 16, agitation of the tea leaf powders and hot water in agitation unit 500 is started. In a step 17, agitation of the tea leaf powders and hot water in agitation unit 500 ends. In a step 18, tea is discharged into the cup placed on placement base 900 as the user operates operation lever 542 of discharge port opening and closing mechanism 540 provided below agitation unit 500.

Second Preparation Flow

A second preparation flow will be described with reference to FIG. 5. This second preparation flow is a flow in which hot water is supplied from apparatus main body 100 to agitation unit 500 after tea leaves are grated in milling unit 300.

In beverage preparation apparatus 1, in a step 21, milling of tea leaves by milling unit 300 is started. In a step 22, milling of tea leaves by milling unit 300 ends. In a step 23, tea leaf powders obtained in step 22 are introduced into agitation unit 500 by a user.

In a step 24, supply of hot water from apparatus main body 100 to agitation unit 500 is started. In a step 25, supply of hot water from apparatus main body 100 to agitation unit 500 ends.

Then, in a step 26, agitation of the tea leaf powders and hot water in agitation unit 500 is started. In a step 27, agitation of the tea leaf powders and hot water in agitation unit 500 ends. In a step 28, tea is discharged into the cup placed on placement base 900 as the user operates operation lever 542 of discharge port opening and closing mechanism 540 provided below agitation unit 500.

Third Preparation Flow

A third preparation flow will be described with reference to FIG. 6. This third preparation flow includes a step of cooling hot water by agitation in agitation unit 500.

In beverage preparation apparatus 1, milling of tea leaves by milling unit 300 in a step 31 and supply of hot water from apparatus main body 100 to agitation unit 500 in a step 33 are simultaneously started. In a step 34, supply of hot water from apparatus main body 100 to agitation unit 500 ends.

Then, in a step 32, milling of tea leaves by milling unit 300 ends, and in a step 35, cooling by agitation of hot water supply is started in agitation unit 500. In a step 36, cooling by agitation of hot water supply in agitation unit 500 ends.

In a step 37, the tea leaf powders obtained in step 32 are introduced into agitation unit 500 by a user.

Then, in a step 38, agitation of the tea leaf powders and hot water in agitation unit 500 is started. In a step 39, agitation of the tea leaf powders and hot water in agitation unit 500 ends. In a step 40, tea is discharged into the cup placed on placement base 900 as the user operates operation lever 542 of discharge port opening and closing mechanism 540 provided below agitation unit 500.

Internal Structure of Apparatus Main Body 100

Figure 7:
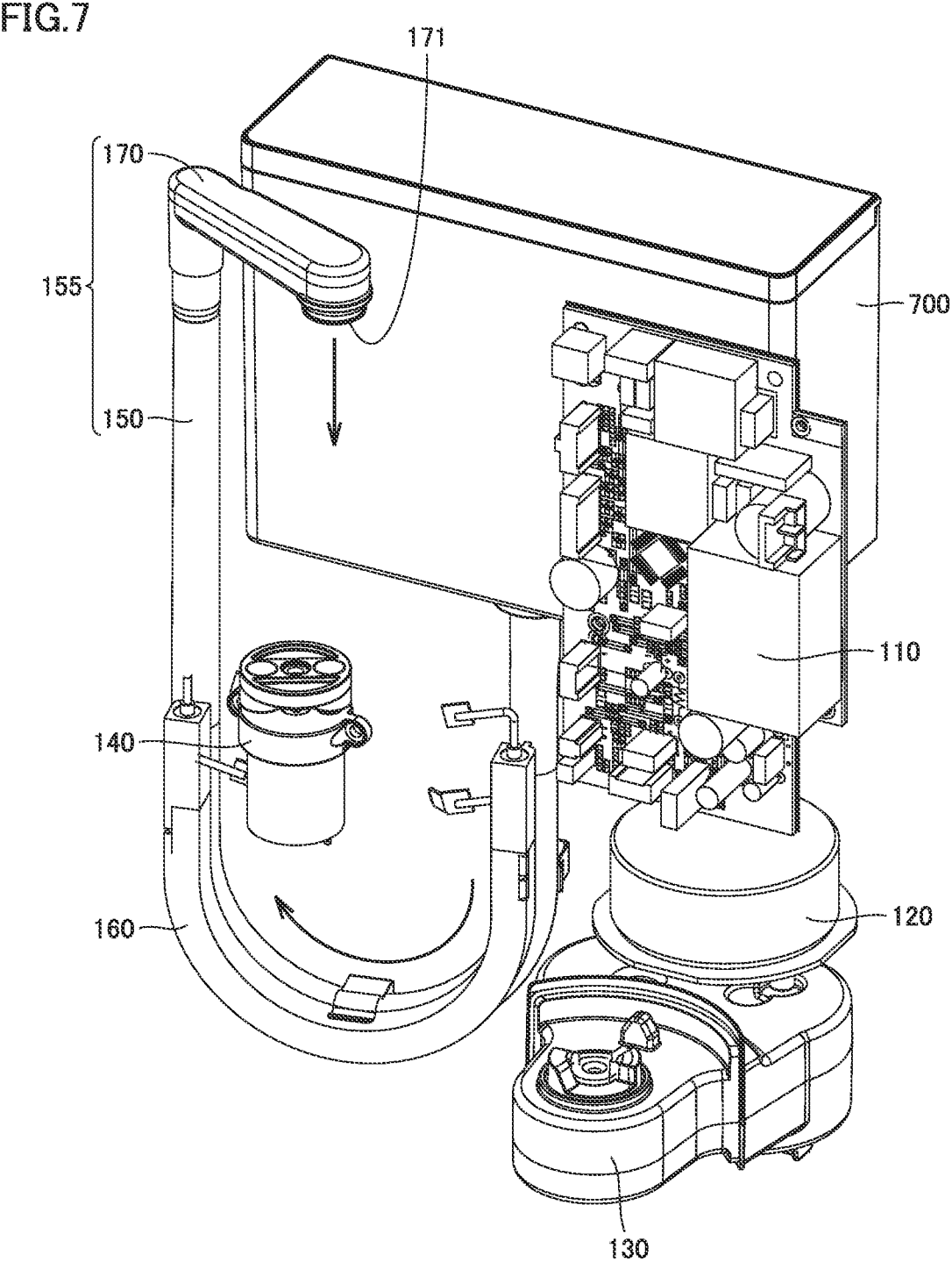
FIG. 7 is a perspective view showing an internal structure of the beverage preparation apparatus in the first embodiment.

An internal structure of beverage preparation apparatus 1 will now be described with reference to FIG. 7. FIG. 7 is a perspective view showing the internal structure of beverage preparation apparatus 1. In apparatus main body 100 of beverage preparation apparatus 1, a control unit 110 including a printed circuit board on which electronic components are mounted is arranged on a front surface side of liquid storage tank 700. Based on input of a start signal by a user, the flow for preparation of tea is executed by control unit 110.

A milling motor unit 120 for providing driving force to milling unit 300 is arranged at a position below control unit 110. Milling driving force coupling mechanism 130 provided to protrude forward for transmitting driving force of milling motor unit 120 to milling unit 300 is provided at a position below milling motor unit 120.

To a bottom surface of liquid storage tank 700, one end of hot water supply pipe 150 extending once downward from the bottom surface and then extending upward in a U shape is coupled. Hot water supply nozzle 170 for pouring hot water into agitation tank 510 of agitation unit 500 is coupled to the other end side of hot water supply pipe 150. A U-shaped heater 160 for heating water which passes through hot water supply pipe 150 is attached to an intermediate region of hot water supply pipe 150. Water becomes hot by being heated by heater 160, and resultant hot water is supplied to agitation tank 510.

Structure of Milling Unit 300

Figure 8:
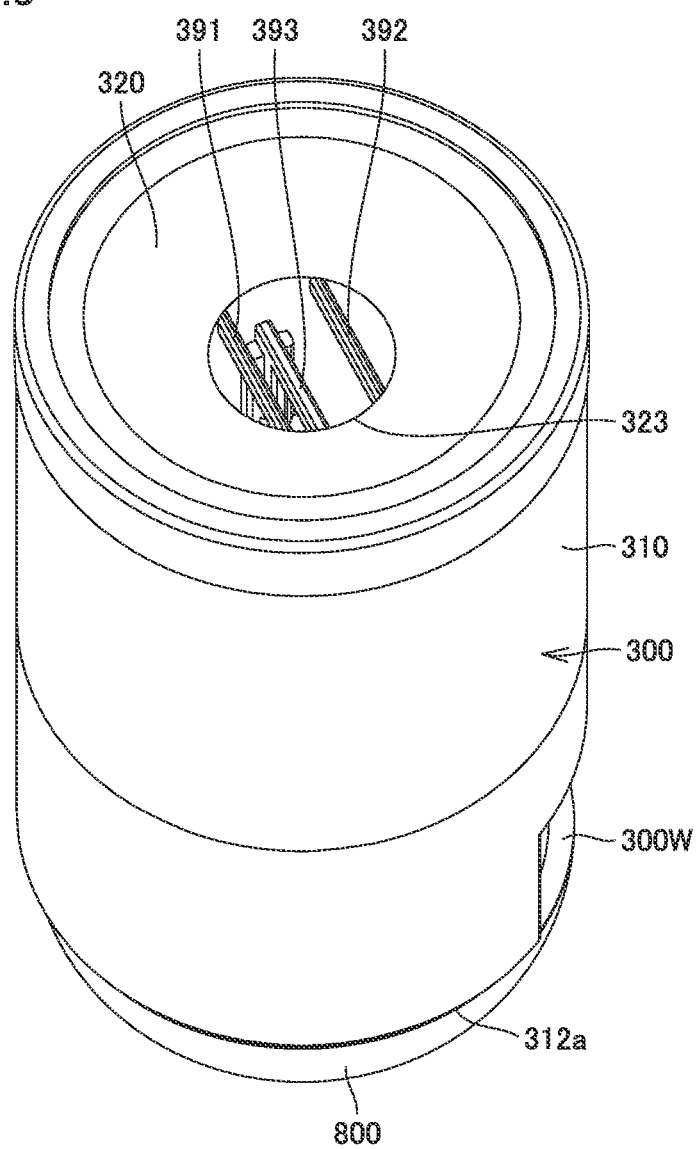
FIG. 8 is a perspective view of a milling unit in the first embodiment.
Figure 9:
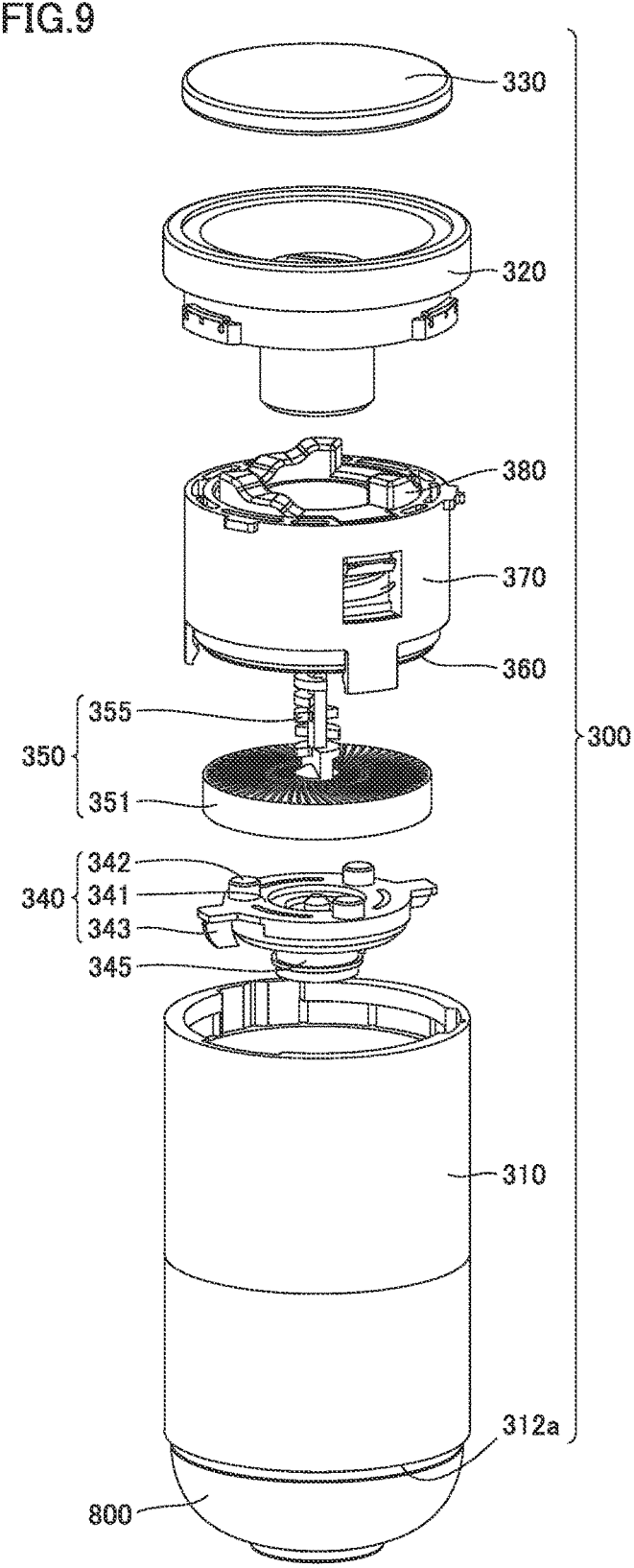
FIG. 9 is an exploded perspective view of the milling unit in the first embodiment.
Figure 10:
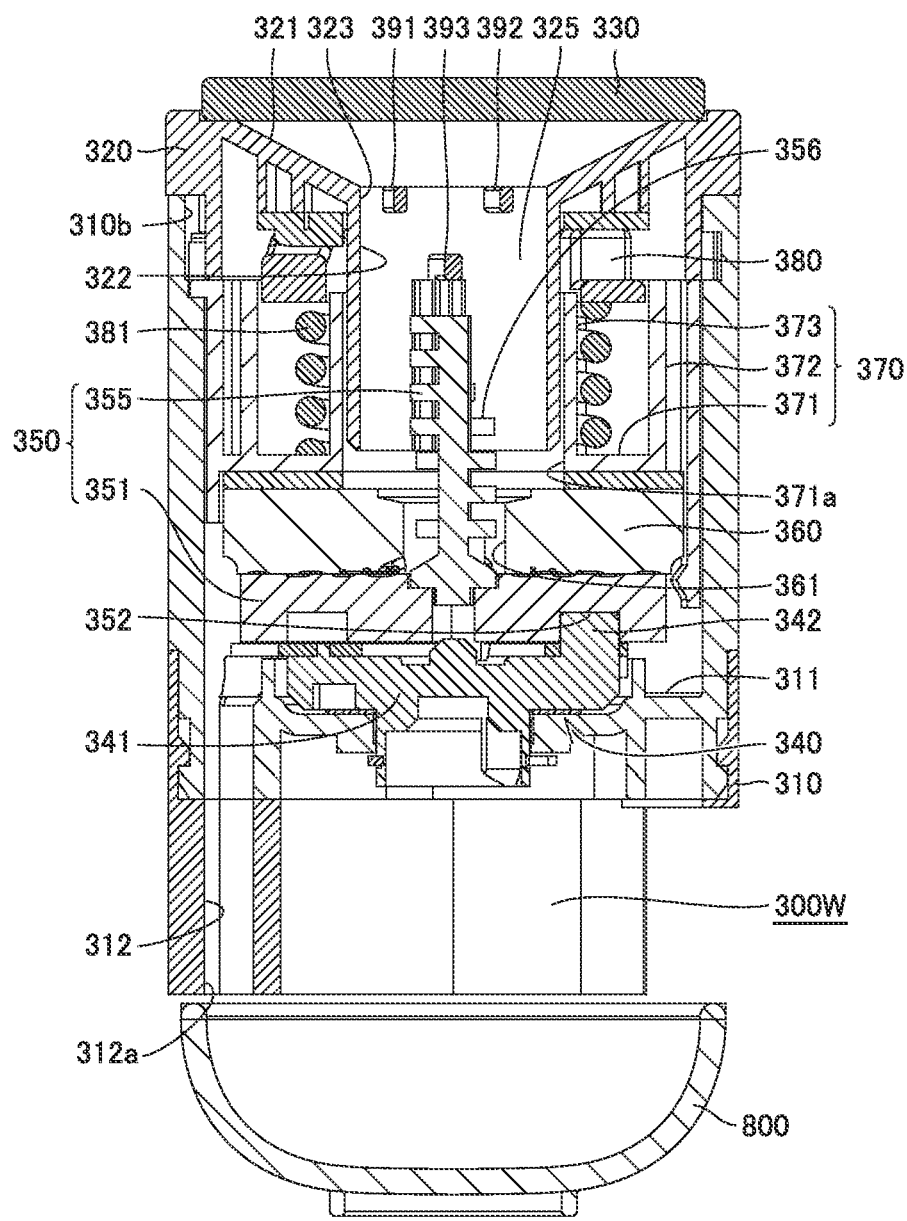
FIG. 10 is a vertical cross-sectional view of the milling unit in the first embodiment.
Figure 11:
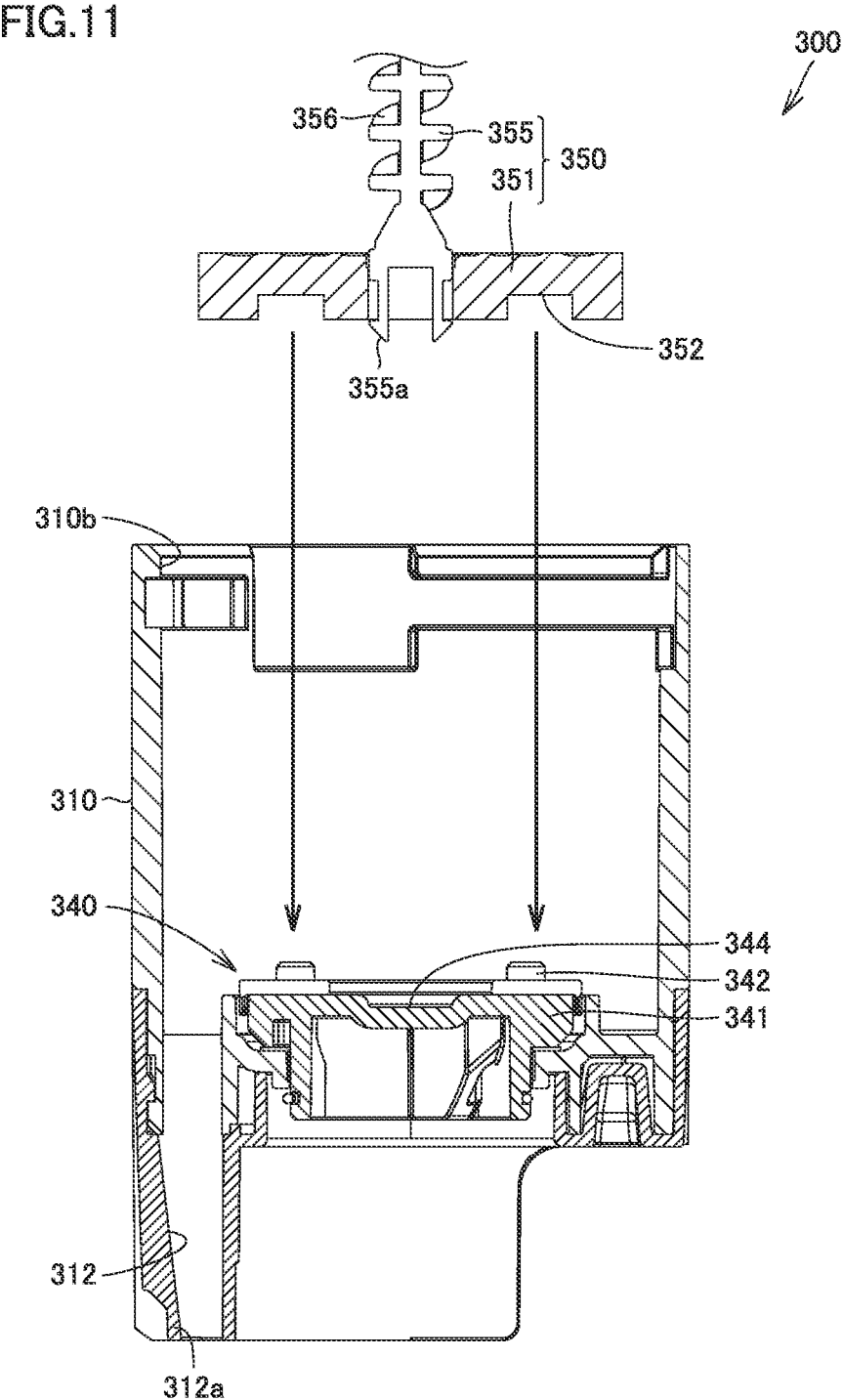
FIG. 11 is a diagram for illustrating an attachment operation for attaching a lower mill of the milling unit in the first embodiment to a lower mill portion support portion.

A structure of milling unit 300 will now be described with reference to FIGS. 8 to 11. FIG. 8 is a perspective view of milling unit 300, FIG. 9 is an exploded perspective view of milling unit 300, and FIG. 10 is a vertical cross-sectional view of milling unit 300. FIG. 11 is a diagram for illustrating an attachment operation for attaching a lower mill main body 351 of milling unit 300 to a lower mill portion support portion 340.

Milling unit 300 has a milling case 310 having a cylindrical shape as a whole, and a window for coupling 300w in which milling driving force coupling mechanism 130 is inserted is provided in a side surface below. A storage portion 311 (see FIG. 10) for storing tea leaf powders produced by lower mill main body 351 and an upper mill 360 which will be described later and a discharge path 312 communicating with storage portion 311 are provided. An outlet port 312a for discharging tea leaf powders into tea leaf powder tray 800 is provided at a lower end portion of discharge path 312 which is a lowermost end portion of milling case 310. Outlet port 312a is provided below an opening portion 513 of a thermally insulated tank 512 (see FIG. 13) which will be described later. Entry through outlet port 312a, of steam resulting from hot water supplied into thermally insulated tank 512 can thus be prevented.

Milling unit 300 includes upper mill 360 and a lower mill portion 350 which grate an object to be grated and lower mill portion support portion 340 to which lower mill portion 350 is attached. In milling case 310, lower mill portion support portion 340, lower mill portion 350, and upper mill 360 are successively provided from below.

Lower mill portion support portion 340 supports lower mill portion 350 from a side opposite to a side where upper mill 360 is located, in an attachment state in which lower mill portion 350 has been attached. Lower mill portion support portion 340 has a substantially columnar main body portion 341, a protrusion portion 342, a powder scraping portion 343, and a groove portion 344 (FIG. 11). A milling shaft 345 is provided on a lower surface of main body portion 341 and extends downward. Milling shaft 345 is coupled to milling driving force coupling mechanism 130. Lower mill portion support portion 340 is thus rotatable while it supports lower mill portion 350.

Protrusion portion 342 is provided on an upper surface of main body portion 341 and protrudes upward. Protrusion portion 342 functions as a first locking portion for locking lower mill portion 350. Powder scraping portion 343 is provided around a circumferential portion of main body portion 341. Powder scraping portion 343 scrapes off tea leaf powders stored in storage portion 311 and transports the tea leaf powders to discharge path 312 as lower mill portion support portion 340 rotates. Groove portion 344 is provided substantially in the center in the upper surface of main body portion 341. A base end portion 355a (see FIG. 11) of a core 355 which will be described later is placed in groove portion 344.

Lower mill portion 350 includes lower mill main body 351 and core 355. Lower mill main body 351 has a recess portion 352 provided in a lower surface. Recess portion 352 is provided at a position corresponding to protrusion portion 342 and locked by protrusion portion 342. Recess portion 352 functions as a second locking portion locked by the first locking portion. Lower mill main body 351 rotates in coordination with lower mill portion support portion 340.

Core 355 is provided in the central portion of lower mill main body 351 and provided to extend upward along a core of a rotation shaft of lower mill main body 351. Core 355 is provided to pass through a through hole 361 provided in a central portion of upper mill 360. Core 355 has a helically provided blade portion 356. Base end portion 355a of core 355 protrudes below a lower surface of lower mill main body 351.

Referring to FIG. 11, in attaching lower mill portion 350 to lower mill portion support portion 340, lower mill portion 350 is arranged above lower mill portion support portion 340 attached in advance in milling case 310. In succession, lower mill portion 350 is inserted in case 310 through an upper end opening portion 310b of milling case 310.

By fitting protrusion portion 342 into recess portion 352 while lower mill portion 350 is moved toward lower mill portion support portion 340 and the center of lower mill portion 350 and the center of lower mill portion support portion 340 are aligned with each other, recess portion 352 is locked by protrusion portion 342. Here, when recess portion 352 and protrusion portion 342 are displaced from each other, protrusion portion 342 is fitted into recess portion 352 by rotating lower mill portion 350. Simultaneously with fitting of protrusion portion 342 into recess portion 352, base end portion 355a of core 355 is placed in groove portion 344. Lower mill portion 350 is thus attached to lower mill portion support portion 340.

Referring to FIGS. 8 to 10, upper mill 360 is held by an upper mill holding member 370 arranged above the upper mill. A not-shown hole portion is provided in an upper surface of upper mill 360. As a not-shown pin portion provided in upper mill holding member 370 enters the hole portion, rotation of upper mill 360 is prevented.

Upper mill holding member 370 includes a bottom surface portion 371 provided with a hole portion 371a, an outer cylindrical portion 372 erected upward from a circumference of bottom surface portion 371, and an inner cylindrical portion 373 erected upward from a circumference of hole portion 371a. Hole portion 371a is provided to communicate with through hole 361 in upper mill 360. A spring 381 pressing upper mill 360 downward and a spring holding member 380 are accommodated in between outer cylindrical portion 372 and inner cylindrical portion 373. Spring 381 adjusts a grating pressure applied between upper mill 360 and lower mill main body 351.

A hopper portion 320 for supplying an object to be grated in between upper mill 360 and lower mill main body 351 is attached to a side of upper end opening portion 310b of milling case 310. Hopper portion 320 has a top plate portion 321, a cylindrical portion 322, and an object-to-be-grated inlet 325. Top plate portion 321 has such a bowl shape that an opening portion 323 is provided substantially in a central portion. Cylindrical portion 322 is provided to extend downward from a circumference of opening portion 323. Cylindrical portion 322 is inserted in inner cylindrical portion 373. Object-to-be-grated inlet 325 is defined by opening portion 323 and cylindrical portion 322. A tip end side of core 355 is accommodated in object-to-be-grated inlet 325.

In the present embodiment, in order to ensure safety by preventing a finger from being caught in core 355 accommodated in object-to-be-grated inlet 325 at the time of introduction of tea leaves, a plurality of linear ribs 391, 392, and 393 are provided across object-to-be-grated inlet 325. Specifically, two ribs 391 and 392 are provided in an upper portion of object-to-be-grated inlet 325, in parallel to each other. Two ribs 391 and 392 are provided at a distance from each other so as not to prevent drop of tea leaves.

One rib 393 is provided between two ribs 391 and 392, in parallel thereto, when viewed in a direction of a central axis of object-to-be-grated inlet 325. Rib 393 is provided below two ribs 391 and 392. In this case, rib 393 is preferably provided above a tip end of core 355.

By thus providing a plurality of ribs 391, 392, and 393 such that a plurality of ribs 391 and 392 located above and rib 393 located below are alternately aligned when viewed in the direction of the central axis of object-to-be-grated inlet 325, entry of a user's finger into object-to-be-grated inlet 325 at the time of introduction of tea leaves into object-to-be-grated inlet 325 can be prevented. Thus, a user's finger can be prevented from being caught in core 355 and safety can be ensured.

After tea leaves are introduced into object-to-be-grated inlet 325, in order to prevent entry of a foreign matter into milling unit 300 and in order to prevent grated tea leaves from scattering, hopper portion 320 is covered with a cover portion 330. When tea leaves are to be introduced, cover portion 330 is removed from hopper portion 320.

Tea leaves introduced into object-to-be-grated inlet 325 are accommodated in a space defined by the upper surface of upper mill 360 exposed through upper mill holding member 370 and an inner circumferential surface of cylindrical portion 322. Tea leaves accommodated in the space are guided in between upper mill 360 and lower mill main body 351 as helical blade portion 356 rotates with rotation of lower mill main body 351.

Tea leaves guided in between upper mill 360 and lower mill main body 351 are grated and fall downward in a form of tea leaf powders from a circumference of upper mill 360 and lower mill main body 351. Some of fallen tea leaf powders is discharged through discharge path 312 into tea leaf powder tray 800 from outlet port 312a. Other fallen tea leaf powders are stored in storage portion 311. Tea leaf powders in storage portion 311 are transported to discharge path 312 and discharged from outlet port 312a into tea leaf powder tray 800 as powder scraping portion 343 rotates with rotation of lower mill portion support portion 340.

Structure of Agitation Unit 500

Figure 12:
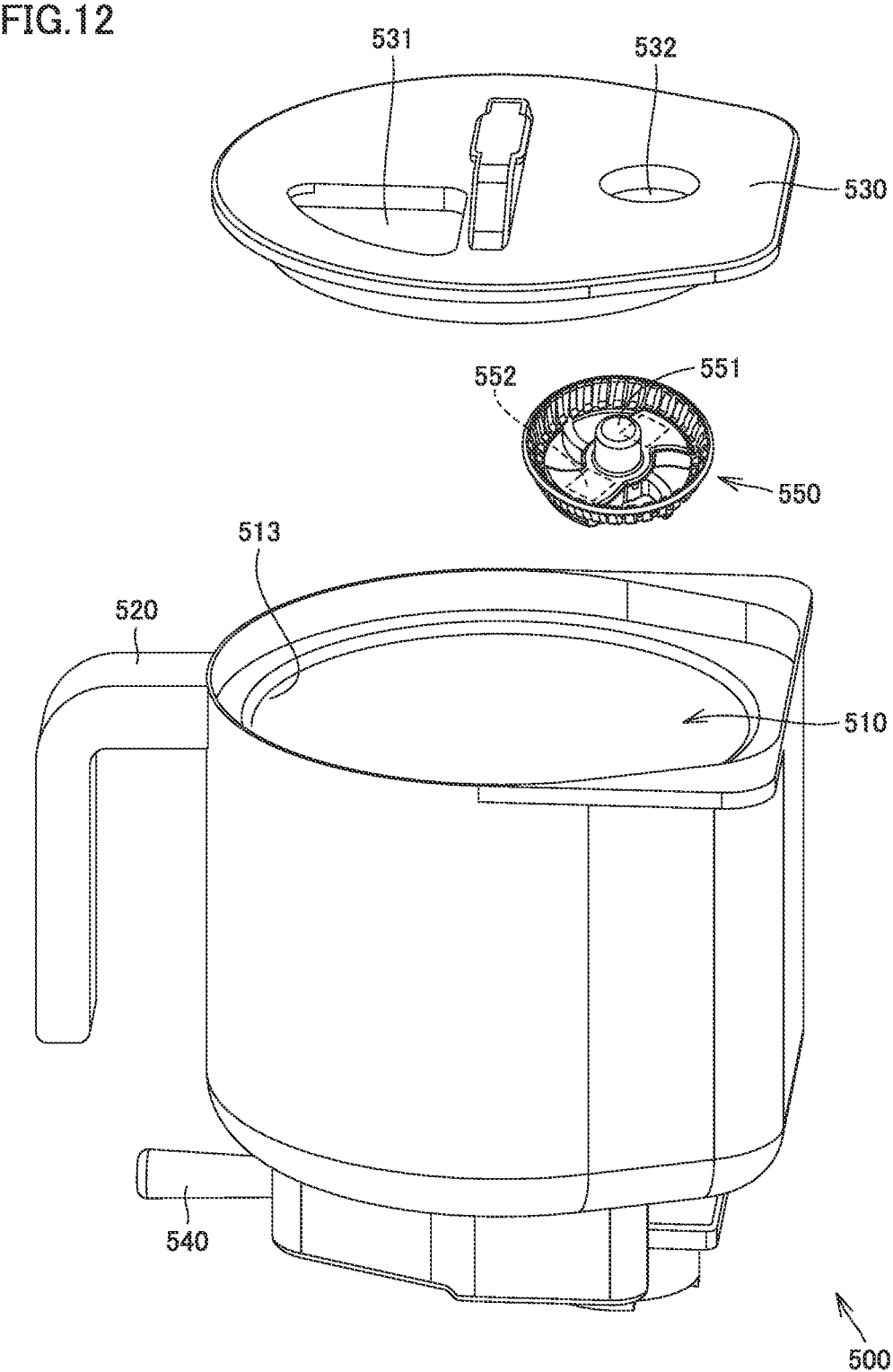
FIG. 12 is an exploded perspective view of an agitation unit in the first embodiment.
Figure 13:
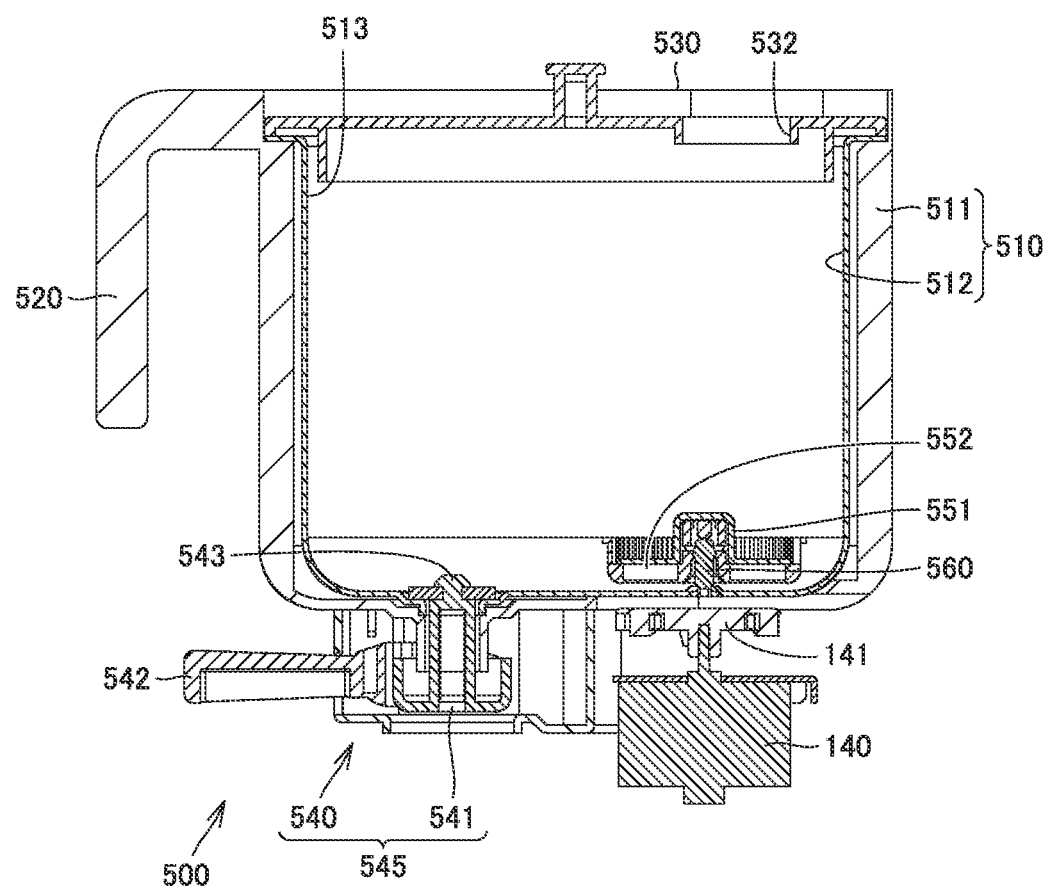
FIG. 13 is a vertical cross-sectional view of the agitation unit in the first embodiment.

A structure of agitation unit 500 will now be described with reference to FIGS. 12 and 13. FIG. 12 is an exploded perspective view of agitation unit 500 and FIG. 13 is a vertical cross-sectional view of agitation unit 500.

Agitation unit 500 includes agitation tank 510, agitation blade 550, and an agitation cover 530. Agitation tank 510 includes an exterior holder 511 made of a resin, thermally insulated tank 512 held by exterior holder 511, and opening portion 513. An integrally resin molded grip 520 is provided in exterior holder 511. Thermally insulated tank 512 has opening portion 513 which has a cylindrical shape with bottom and opens upward.

Agitation cover 530 covers opening portion 513 so as to be able to open and close opening portion 513. Agitation cover 530 is provided with a powder inlet 531 for introducing tea leaf powders grated by milling unit 300 and a hot water supply inlet 532 through which hot water formed in apparatus main body 100 is poured from hot water supply nozzle 170. Hot water supply inlet 532 is provided at a position corresponding to supply port 171 of hot water supply nozzle 170.

Powder inlet 531 and hot water supply inlet 532 communicate with opening portion 513. Tea leaf powders introduced from moved tea leaf powder tray 800 to powder inlet 531 are introduced into agitation tank 510 through opening portion 513. Hot water poured through hot water supply inlet 532 from hot water supply nozzle 170 is supplied into agitation tank 510 through opening portion 513.

Agitation blade 550 is placed on a bottom portion of agitation tank 510. A rotation shaft 560 extending upward is provided on the bottom portion of agitation tank 510, and a bearing portion 551 for agitation blade 550 is inserted in this rotation shaft 560.

A magnet 552 is embedded in agitation blade 550. In agitation motor contactless table 140A, magnet 552 embedded in agitation blade 550 and magnet 141 provided on a side of agitation motor unit 140 are magnetically coupled in a contactless state, so that rotational driving force of agitation motor unit 140 is transmitted to agitation blade 550.

Agitation tank 510 further includes a discharge portion 545 for discharging a prepared beverage. Discharge portion 545 is provided in agitation tank 510 in a portion protruding from apparatus main body 100. Discharge portion 545 includes a discharge port 541 provided in the bottom portion of agitation tank 510 and discharge port opening and closing mechanism 540 opening and closing discharge port 541. Discharge port 541 is a portion for discharging tea prepared by agitation of tea leaf powders and hot water by agitation blade 550.

Discharge port opening and closing mechanism 540 includes an opening and closing nozzle 543 inserted into discharge port 541 so as to be able to open and close discharge port 541 and operation lever 542 controlling a position of opening and closing nozzle 543. Opening and closing nozzle 543 is biased to close discharge port 541 by a biasing member (not shown) such as a spring in a normal state. When a user moves operation lever 542 against biasing force, opening and closing nozzle 543 moves to open discharge port 541 and thus tea in agitation tank 510 is poured into a cup (not shown) placed on placement base 900.

Prepared tea may be high in viscosity depending on a type of tea leaves and an amount of tea leaf powders. In such a case, it may take time to completely pour tea in the agitation tank through discharge port 541.

In such a case, agitation tank 510 may be removed from agitation tank attachment portion 190 and agitation cover 530 may be removed from opening portion 513, so that tea is poured into a cup through opening portion 513 by tilting agitation tank 510.

A lip portion may be provided in agitation tank 510 such that a part of opening portion 513 is exposed through agitation cover 530. In this case, tea can be poured into a cup from the lip portion after agitation tank 510 is removed from agitation tank attachment portion 190, without removing agitation cover 530 from opening portion 513. Furthermore, in this case, agitation tank 510 may be constructed such that hot water can be supplied from the lip portion in supplying hot water from hot water supply nozzle 170 into agitation tank 510.

In general, in a beverage preparation apparatus having a beverage preparation tank, in pouring a beverage prepared in the beverage preparation tank to the outside, only either one pouring method of pouring a beverage to the outside from a discharge portion provided in a bottom surface portion of the beverage preparation tank and pouring a beverage to the outside from an opening in an upper surface of the beverage preparation tank could be chosen. Therefore, an appropriate pouring method in accordance with a prepared beverage could not be chosen.

In the present embodiment, agitation tank 510 is provided above such a vessel as a cup into which a beverage prepared as above is poured and a discharge portion for discharging a prepared beverage is provided in agitation tank 510 in the portion protruding from the apparatus main body. Furthermore, agitation tank 510 is removably attached to the agitation tank. With such a construction, depending on a property such as a viscosity of a prepared beverage, pouring a beverage to the outside from the discharge portion or pouring a beverage to the outside from opening portion 513 of removed agitation tank 510 can be chosen as appropriate. Therefore, convenience is remarkably improved.

As set forth above, in the present embodiment, outlet port 312a for discharging tea leaf powders is located below opening portion 513 of agitation tank 510, and tea leaf powder tray 800 collecting tea leaf powders is provided such that it can be held by a user and moved to above agitation tank 510. With such a construction, entry through outlet port 312a into discharge path 312, of steam resulting from hot water supplied to agitation tank 510, can reliably be prevented, while tea leaf powders can be introduced into agitation tank 510.

Consequently, in the present embodiment, entry of steam into a powder discharge path can reliably be prevented with a simplified construction.

Second Embodiment

In general, in a case that lower mill portion support portion 340 and lower mill portion 350 are attached by fitting lower mill portion 350 from above into lower mill portion support portion 340 accommodated in a housing, side surfaces of lower mill portion support portion 340 and lower mill portion 350 are covered with the housing and a position of fitting cannot sufficiently visually be recognized in some cases. In such a case, without positioning of lower mill portion support portion 340 and lower mill portion 350 sufficiently being taken into account, time and efforts required for attachment are concerned.

A beverage preparation apparatus 1A in the present embodiment is constructed to allow easy positioning of lower mill portion support portion 340 and lower mill portion 350 and easy attachment of lower mill portion support portion 340 and lower mill portion 350.

Beverage preparation apparatus 1A in the present embodiment will be described with reference to FIG. 14. FIG. 14 is a diagram for illustrating an attachment operation for attaching the lower mill of a milling unit provided in the beverage preparation apparatus in the present embodiment to the lower mill portion support portion.

Beverage preparation apparatus 1A in the present embodiment is different from beverage preparation apparatus 1 in the first embodiment in construction of lower mill portion support portion 340 and lower mill portion 350 of a milling unit 300A and substantially identical thereto in other features.

Lower mill portion 350 includes a protruding piece 357 provided to protrude downward from the lower surface thereof. Here, the lower surface of lower mill portion 350 is formed by the lower surface of lower mill main body 351 and base end portion 355a of core 355.

Though a case that protruding piece 357 is provided to extend further downward from base end portion 355a of core 355 is exemplified in the present embodiment, limitation thereto is not intended, and protruding piece 357 may be provided to protrude downward from the lower surface of lower mill main body 351. In this case as well, protruding piece 357 is provided on the lower surface of lower mill portion 350.

Lower mill portion support portion 340 has a protruding piece reception portion 346 which can receive protruding piece 357. Protruding piece reception portion 346 is provided substantially in the center of the upper surface of main body portion 341. Protruding piece reception portion 346 includes an inclined portion 346a inclined downward toward a central axis of lower mill portion support portion 340 and a protruding piece insertion hole portion 346b in which protruding piece 357 is inserted.

In attaching lower mill portion 350 to lower mill portion support portion 340, lower mill portion 350 is arranged above lower mill portion support portion 340 attached in advance in milling case 310. In succession, lower mill portion 350 is inserted in case 310 through upper end opening portion 310b in milling case 310.

Protruding piece 357 and inclined portion 346a abut to each other as lower mill portion 350 is moved toward lower mill portion support portion 340. By further moving lower mill portion 350 downward, protruding piece 357 is guided by inclined portion 346 and inserted in protruding piece insertion hole portion 346b. Thus, protruding piece reception portion 346 functions as a guide portion for assisting movement of lower mill portion 350 in attachment of lower mill portion 350 to lower mill portion support portion 340.

As protruding piece 357 is inserted in protruding piece insertion hole portion 346b, the center of lower mill portion 350 and the center of lower mill portion support portion 340 are readily aligned with each other. In succession, recess portion 352 is locked by protrusion portion 342 by fitting protrusion portion 342 into recess portion 352 by rotating lower mill portion 350 while the center of lower mill portion 350 and the center of lower mill portion support portion 340 are aligned with each other. Lower mill portion 350 can thus be attached to lower mill portion support portion 340.

Thus, in the present embodiment, the protruding piece protruding downward is provided on the lower surface of lower mill portion 350 and lower mill portion 350 is moved toward lower mill portion support portion 340 along protruding piece reception portion 346 serving as the guide portion. Thus, the centers of lower mill portion 350 and lower mill portion support portion 340 can readily be aligned with each other and protrusion portion 342 as the first locking portion and recess portion 352 as the second locking portion can easily be locked by each other.

Consequently, in the present embodiment, in addition to the effect substantially the same as in the first embodiment being obtained, lower mill portion 350 can readily be attached to lower mill portion support portion 340.

Third Embodiment

A beverage preparation apparatus 1B in the present embodiment is constructed to achieve easy positioning of lower mill portion support portion 340 and lower mill main body 351 and easy attachment of lower mill portion support portion 340 and lower mill main body 351 as in the second embodiment.

Figure 15:
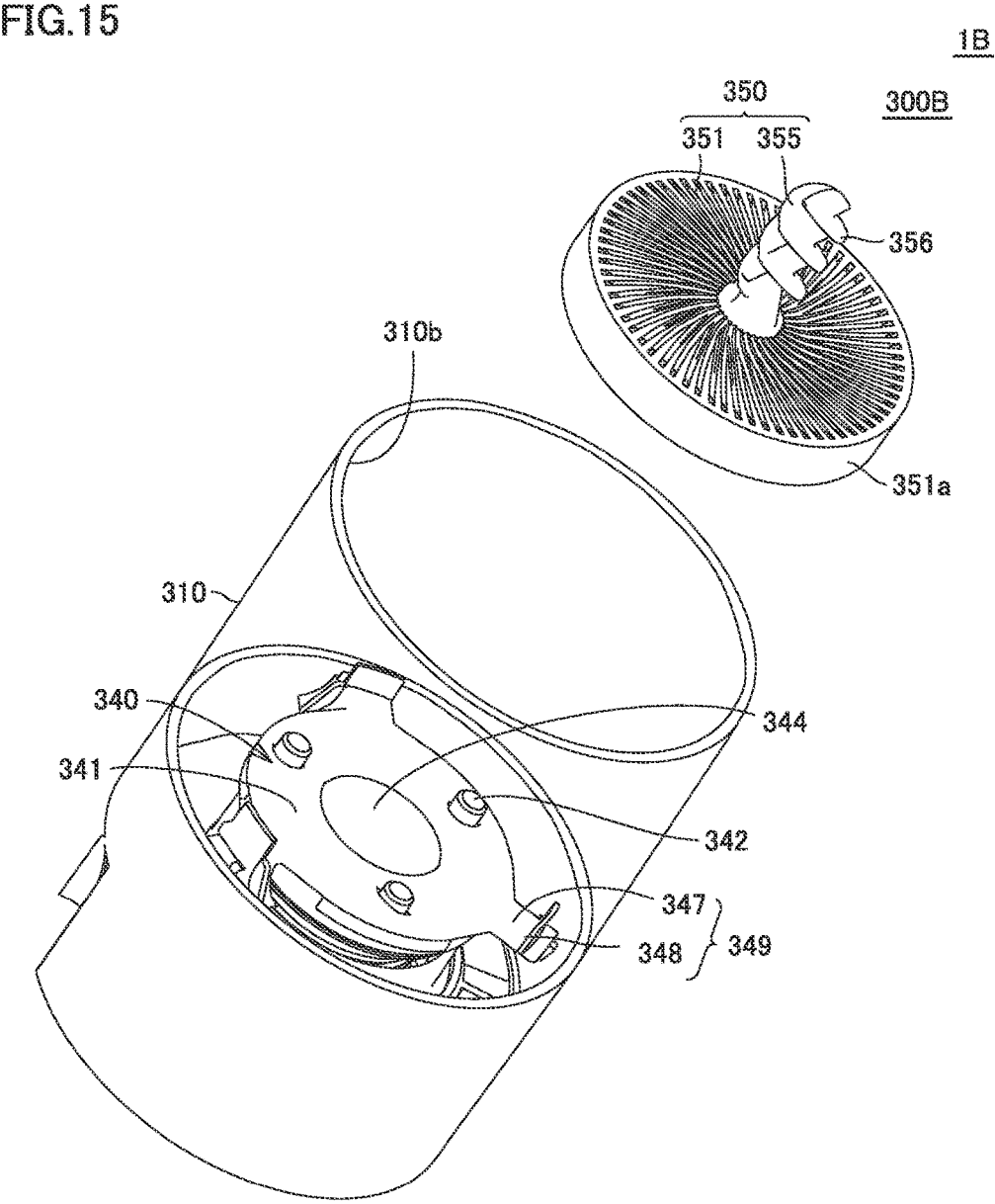
FIG. 15 is a diagram for illustrating an attachment operation for attaching the lower mill of a milling unit provided in a beverage preparation apparatus in a third embodiment to the lower mill portion support portion.

Beverage preparation apparatus 1B in the present embodiment will be described with reference to FIG. 15. FIG. 15 is a diagram for illustrating an attachment operation for attaching the lower mill of a milling unit provided in the beverage preparation apparatus in the present embodiment to the lower mill portion support portion.

Beverage preparation apparatus 1B in the present embodiment is different from beverage preparation apparatus 1 in the first embodiment in construction of lower mill portion support portion 340 of a milling unit 300B and substantially identical thereto in other features.

Lower mill portion support portion 340 includes an arm portion 349 provided in a circumferential portion of main body portion 341. Arm portion 349 supports an outer circumferential portion of lower mill main body 351 while lower mill portion 350 is attached to lower mill portion support portion 340. Arm portion 349 includes a connection portion 347 connected to the circumferential portion of main body portion 341 and provided to radially protrude and a wall portion 348 provided to protrude upward from an end portion located opposite to a side of connection to main body portion 341. An inner surface of wall portion 348 is provided to be in contact with a circumferential surface 351a of lower mill main body 351.

In attaching lower mill portion 350 to lower mill portion support portion 340, lower mill portion 350 is arranged above lower mill portion support portion 340 attached in advance in milling case 310. In succession, lower mill portion 350 is inserted in case 310 through upper end opening portion 310b in milling case 310.

Circumferential surface 351a of lower mill main body 351 and the inner surface of wall portion 348 abut to each other by moving lower mill portion 350 toward lower mill portion support portion 340. By further moving lower mill portion 350 downward, circumferential surface 351a of lower mill main body 351 is moved downward while sliding over the inner surface of wall portion 348. Thus, arm portion 349 functions as a guide portion for assisting movement of lower mill portion 350 in attachment of lower mill portion 350 to lower mill portion support portion 340.

As circumferential surface 351a of lower mill main body 351 and the inner surface of wall portion 348 abut to each other, the center of lower mill portion 350 and the center of lower mill portion support portion 340 can readily be aligned with each other. In succession, recess portion 352 is locked by protrusion portion 342 by fitting protrusion portion 342 into recess portion 352 by rotating lower mill portion 350 while the center of lower mill portion 350 and the center of lower mill portion support portion 340 are aligned with each other. Lower mill portion 350 can thus be attached to lower mill portion support portion 340.

Thus, in the present embodiment, lower mill portion 350 is moved toward lower mill portion support portion 340 along wall portion 348 of arm portion 349, so that the centers of lower mill portion 350 and lower mill portion support portion 340 can readily be aligned with each other and protrusion portion 342 as the first locking portion and recess portion 352 as the second locking portion can readily be locked by each other.

Consequently, in the present embodiment, in addition to the effect substantially the same as in the first embodiment being obtained, lower mill portion 350 can readily be attached to lower mill portion support portion 340.

Though a case that recess portion 352 is provided in the lower surface of lower mill main body 351 and protrusion portion 342 is provided on the upper surface of lower mill portion support portion 340 has been described by way of example in the first to third embodiments described above, a protrusion portion may be provided on the lower surface of lower mill main body 351 and a recess portion may be provided in the upper surface of lower mill portion support portion 340. In this case, the protrusion portion provided in the lower mill main body corresponds to the second locking portion, the recess portion provided in the lower mill portion support portion corresponds to the first locking portion, and they are locked by each other.

Though a case that agitation tank 510 is constituted of exterior holder 511 and thermally insulated tank 512 has been described by way of example in the first to third embodiments described above, limitation thereto is not intended and it may consist of thermally insulated tank 512. Instead of thermally insulated tank 512, a vessel not having thermal insulation but having heat resistance may be employed.

Though a case that a part of agitation tank 510 is provided to protrude from the front surface of apparatus main body 100 has been described by way of example in the first to third embodiments described above, a direction of protrusion of a part of agitation tank 510 is not limited to a front direction so long as a beverage in agitation tank 510 can be poured.

Though a case that agitation tank 510 is removably attached to apparatus main body 100 has been described by way of example in the first to third embodiments described above, limitation thereto is not intended and it may be fixed to apparatus main body 100 so long as powders and hot water can be introduced in the agitation tank and agitation tank 510 is constructed to be cleaned. In this case, a prepared beverage is poured to the outside from the discharge portion provided in agitation tank 510.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1, 1A, 1B beverage preparation apparatus; 100 apparatus main body; 110 control unit; 120 milling motor unit; 130 milling driving force coupling mechanism; 140 agitation motor unit; 140A contactless table; 141 magnet; 150 hot water supply pipe; 155 liquid supply path; 160 heater; 170 hot water supply nozzle; 171 supply port; 180 unit attachment portion; 190 agitation tank attachment portion; 195 liquid storage tank attachment portion; 300 milling unit; 300w window for coupling; 310 milling case; 310b upper end opening portion; 311 storage portion; 312 discharge path; 312a outlet port; 320 hopper portion; 321 top plate portion; 322 cylindrical portion; 323 opening portion; 325 object-to-be-grated inlet; 330 cover portion for object to be grated; 340 lower mill portion support portion; 341 main body portion; 342 protrusion portion; 343 powder scraping portion; 344 groove portion; 345 milling shaft; 346 protruding piece reception portion; 346a inclined portion; 346b protruding piece insertion hole portion; 347 connection portion; 348 wall portion; 349 arm portion; 350 lower mill portion; 351 lower mill main body; 351a circumferential surface; 352 recess portion; 355 core; 355a base end portion; 356 blade portion; 357 protruding piece; 360 upper mill; 361 through hole; 370 upper mill holding member; 371 bottom surface portion; 371a hole portion; 372 outer cylindrical portion; 373 inner cylindrical portion; 380 spring holding member; 381 spring; 391, 392, 393 rib; 500 agitation unit; 510 agitation tank; 511 exterior holder; 512 thermally insulated tank; 513 opening portion; 520 grip; 530 agitation cover; 531 powder inlet; 532 hot water supply inlet; 540 discharge port opening and closing mechanism; 541 discharge port; 542 operation lever; 543 opening and closing nozzle; 545 discharge portion; 550 agitation blade; 551 bearing portion; 552 magnet; 560 rotation shaft; 700 liquid storage tank; 710 tank main body; 720 lid portion; 800 tea leaf powder tray; and 900 placement base.

We claim:

1. A beverage preparation apparatus for preparing a beverage by using powders, comprising:
   a milling unit which obtains powder by grating an object to be grated;
   a liquid storage tank which stores a liquid;
   a liquid supply path having one end connected to the liquid storage tank and having the other end provided with a supply port;
   a powder reception portion which is provided to be removable and receives the powder obtained by the milling unit; and
   an agitation tank which has an opening portion opening upward and mixes the powder introduced through the opening portion from the removed powder reception portion and the liquid supplied through the opening portion from the supply port,
   the milling unit including an outlet port which discharges the obtained powder into the powder reception portion, and
   the outlet port being located below the opening portion.

2. The beverage preparation apparatus according to claim 1, wherein
   the milling unit is arranged at a distance from the agitation tank so as to be displaced from the agitation tank below the agitation tank.

3. The beverage preparation apparatus according to claim 1, wherein
   a part of the agitation tank is provided to protrude from a main body of the beverage preparation apparatus in a direction intersecting with a vertical direction,
   the agitation tank further includes a discharge portion for discharging a prepared beverage, and
   the discharge portion is provided in the agitation tank in a portion protruding from the main body of the beverage preparation apparatus.

4. The beverage preparation apparatus according to claim 3, wherein
   the main body of the beverage preparation apparatus includes an agitation tank attachment portion for externally attaching the agitation tank,
   the agitation tank is removably attached to the agitation tank attachment portion, and
   the prepared beverage can be poured through the opening portion, with the agitation tank having been removed from the agitation tank attachment portion.

5. The beverage preparation apparatus according to claim 1, wherein
   the milling unit includes an upper mill and a lower mill portion which grate the object to be grated and a lower mill portion support portion to which the lower mill portion is attached,
   the lower mill portion support portion has a first locking portion for locking the lower mill portion and a guide portion for assisting movement of the lower mill portion in attachment of the lower mill portion to the lower mill portion support portion and supports the lower mill portion from a side opposite to a side where the upper mill is located in an attachment state in which the lower mill portion is attached,
   the lower mill portion has a second locking portion locked by the first locking portion, and
   the lower mill portion is attached to the lower mill portion support portion as the lower mill portion is moved along the guide portion toward the lower mill portion support portion so that the first locking portion and the second locking portion are locked by each other.

6. The beverage preparation apparatus according to claim 1, further comprising:
   an agitation blade provided on a bottom portion of the agitation tank; and
   an agitation motor driving the agitation blade to agitate the powder and liquid.

* * * * *